United States Patent [19]

Arai et al.

[11] 4,194,824
[45] Mar. 25, 1980

[54] CAMERA EQUIPPED WITH AUTOMATIC UNWINDING DEVICE

[75] Inventors: Akihiro Arai, Urawa; Eiji Yamamori, Tokyo, both of Japan

[73] Assignee: Asahi Kogaku Kogyo Kabushiki Kaisha, Tokyo, Japan

[21] Appl. No.: 917,239

[22] Filed: Jun. 20, 1978

[30] Foreign Application Priority Data

Jun. 24, 1977 [JP] Japan .................................. 52/83263

[51] Int. Cl.² .......................... G03B 1/18; G03B 19/12
[52] U.S. Cl. ..................................... 354/173; 354/209
[58] Field of Search ............... 354/170, 173, 209, 214, 354/207

[56] References Cited

U.S. PATENT DOCUMENTS

| | | | |
|---|---|---|---|
| 3,762,291 | 10/1973 | Kimura et al. | 354/173 X |
| 3,967,291 | 6/1976 | Nagashima | 354/204 X |
| 3,999,197 | 12/1976 | Iwashita et al. | 354/173 |
| 4,017,875 | 4/1977 | Yamamichi | 354/209 |

*Primary Examiner*—Donald A. Griffin
*Attorney, Agent, or Firm*—Sughrue, Rothwell, Mion, Zinn and Macpeak

[57] ABSTRACT

A device for decoupling the film transport mechanism in a camera is operable either independently, for performing multiple-exposure photography, or by an unwinding lever which simultaneously reverses the drive direction of the film for unwinding.

3 Claims, 4 Drawing Figures

CAMERA EQUIPPED WITH AUTOMATIC UNWINDING DEVICE

BACKGROUND OF THE INVENTION

This invention relates to a camera equipped with a multiple exposure photographing mechanism, and more particularly to such a camera equipped with an automatic unwinding device. It is known to equip a camera with a film unwinding member adapted to release a film-transporting mechanism, upon unwinding a film. In general, since the film transport mechanism must be disabled for multiple exposure photography, the unwinding member is used for both the automatic unwinding operation and for the multiple exposure photography. Typically, this is accomplished by designing the unwinding member so that when fully actuated it implements unwinding while when only half depressed it disengages the transport mechanism. Such a camera is described in Japanese Patent Application 50-155223. As described in that application, if the automatic unwinding operating member is operated halfway in the course of the movement of releasing the transport mechanism for multiple-exposure photography, then there is incurred a danger of the automatic unwinding operation being effected by mistake.

SUMMARY OF THE INVENTION

It is an object of the present invention to prevent the erroneous operation of the unwinding mechanism.

This is accomplished by providing an operating member for disengaging the film transport mechanism which is independently operable for multiple exposure photography and which is also operable by the unwinding member for performing the film unwinding operation. Thus, there is no need to use the unwinding member during multiple exposure photography and erroneous operation thereof is prevented.

DETAILED DESCRIPTION OF THE INVENTION

Figure 1:
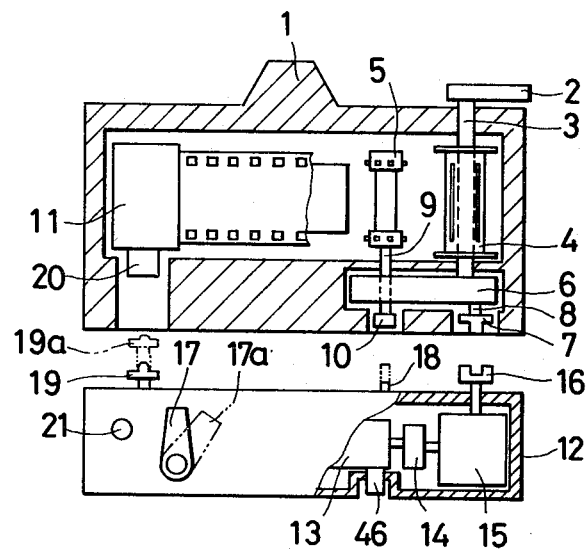
FIG. 1 is a cross-sectional view showing an automatic unwinding device for use in a camera.

The present invention will now be described in detail with reference to one embodiment of the invention. Referring to FIG. 1, there is shown a multiple exposure mechanism and an automatic unwinding device for use in a camera. Provided in a camera body 1 is a winding lever 2 which allows the manual winding operation. The winding lever 2 is supported on a winding shaft 3 through the medium of a one-way clutch mechanism (not shown), in a manner that the winding shaft 3 may be rotated by the lever 2 only in the direction to take up a film. A film take-up spool 4 is attached to the winding shaft 3 through the medium of a friction spring (not shown) in a well known manner. In addition, the winding shaft 3 is coupled to a film transporting mechanism comprising a rotating sprocket 5 for transporting a given length of a film, as well as a mechanism 6 consisting of a shutter mechanism (not shown) and a charging mechanism adapted to store energy or power for operating a mirror box mechanism. The mechanism 6 includes a joint 7 provided on a joint shaft 8 for allowing the winding of a film from the bottom of the camera, and is operably coupled to a sprocket shaft 9 through a clutch (not shown). Shown at 10 is an unwinding button. When the unwinding button is depressed, then the clutch interposed between the sprocket shaft 9 and the mechansim 6 is released from its engaged condition, so that the sprocket 5 becomes free to rotate. This allows the film to be unwound from the spool 4 into a patrone 11. In addition, in the case of multiple-exposure photography, when the unwinding button 10 is depressed, then a locking member (not shown) cooperative with the unwinding button 10 is so designed as to lock the film winding spool 4. As a result, in case the unwinding button 10 is depressed and the winding lever 2 is rotated, then the charging mechanism for the mechanism 6 may be operated while the sprocket 5 serving as a film transporting mechanism for transporting a film a given length is disengaged from the mechanism 6 and, due to the film winding spool 4 being locked, the film is not transported, thereby allowing multiple exposure photography.

According to the aforenoted arrangement, the unwinding button 10 may be used as an operating member for operating the multiple exposure photography. An automatic unwinding device 12 may be operated by means of an electric motor 13 for the automatic unwinding operation; however, the electric motor 13 is also used for the automatic winding operation, so that the automatic winding operation may be effected by the same electric motor 13. For the automatic winding operation, power is transmitted from the electric motor 13 through the one-way clutch 14 and automatic winding mechanism 15 to a winding coupling member 16, the aforenoted one-way clutch 14 being adapted to transmit a power only in the direction to wind a film. The winding coupling member 16 is so positioned as to face the joint 7 in a camera. Thus, when the winding coupling member 16 is coupled to the joint 7, power from the electric motor 13 may be transmitted to the mechanism 6 in the camera, thereby effecting the automatic winding operation of a film. Shown at 17 is an unwinding lever. When the unwinding lever 17 is rotated, then an unwinding pin 18 is positioned so as to be opposed to the unwinding button 10 may be brought to its projecting position, so that the unwinding button 10 may be depressed to allow the unwinding operation. Furthermore, the coupling member 19 is brought to its projecting position 19a to engage a film spool shaft 20. A change-over switch (to be discussed later) adapted to change the rotational direction of the electric motor 13 may be changed over so as to allow the rotation of the electric motor 13 in the direction to unwind a film, and then power from the electric motor 13 may be transmitted to the film spool shaft 20, thereby allowing the automatic unwinding operation. Still further, there is provided a multiple exposure operating member 46 adapted to bring the unwinding pin 18 to its projecting position, so that the multiple exposure photography may be independently effected by depressing the unwinding button 10.

Between the automatic winding operation and automatic unwinding operation the rotational direction of the electric motor 13 must be reversed. For this reason, a one-way clutch 14 is provided on the side of the winding mechanism, disabling the rotation of the winding coupling member 16, while a clutch 30 (to be described later) is provided for disabling the unwinding coupling member 19. The unwinding lever 17 is normally locked, and hence may be operated only when depressing a locking button 21. Although for the purposes of this description the automatic winding and unwinding devices are here illustrated in a detachable unit, it is needless to mention that they may be built into a camera body.

Figure 2:
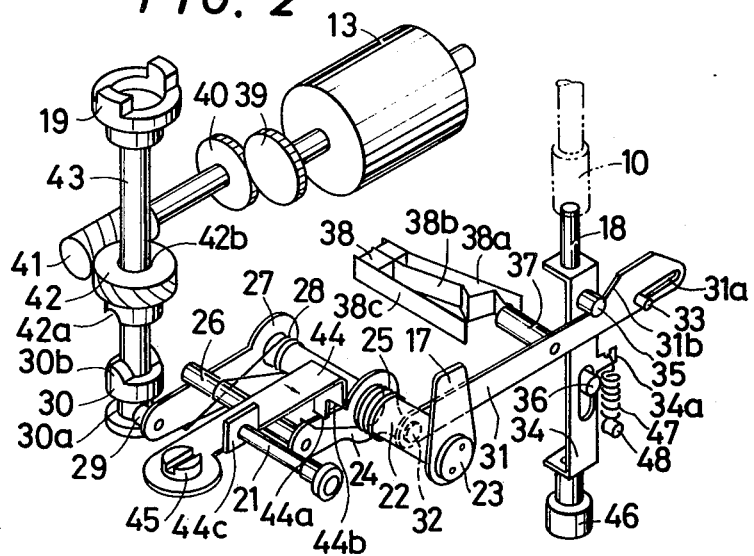
FIG. 2 is a perspective view showing an automatic unwinding mechanism maintained in a normal condition.
Figure 3:
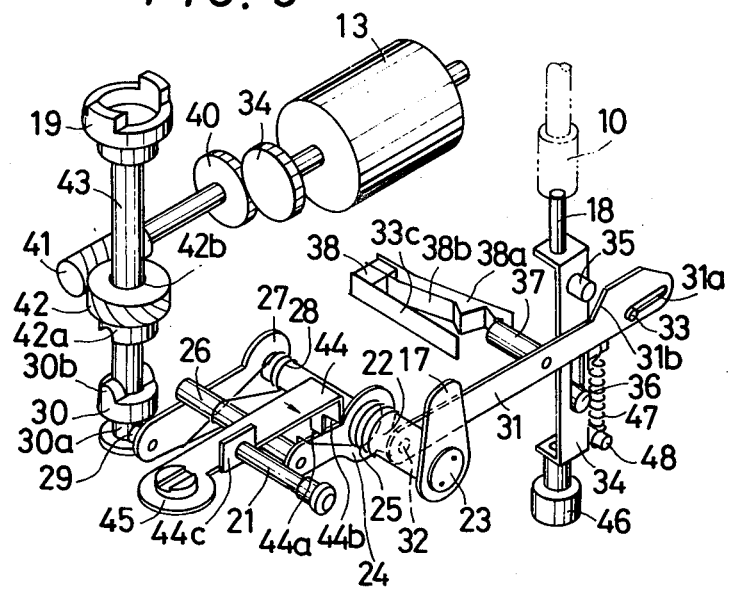
FIG. 3 is a perspective view showing a multiple exposure condition.
Figure 4:
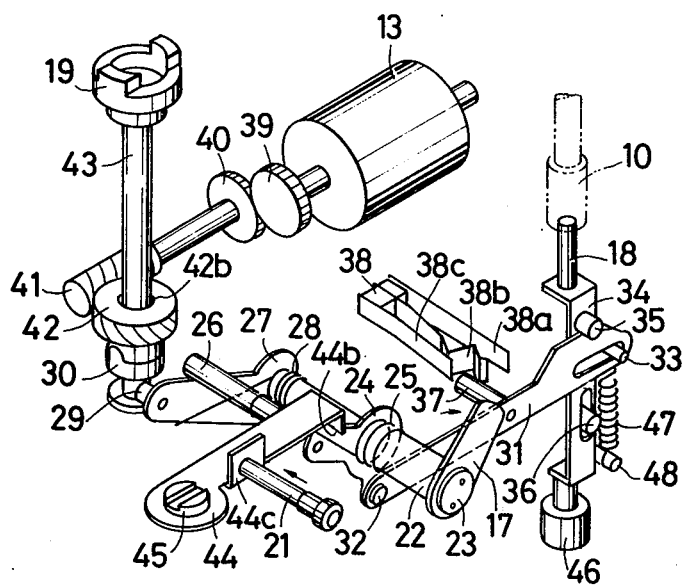
FIG. 4 is a perspective view showing an automatic unwinding condition.

The automatic unwinding mechanism will be described in more detail with reference to FIGS. 2, 3 and 4. FIG. 2 refers to a condition where the unwinding lever 17 assumes a normal position, representing the normal operation of the camera. FIG. 3 refers to a condition where the multiple exposure operating member 46 is operated. FIG. 4 refers to a condition where the unwinding lever 17 is operated, representing the automatic unwinding operation. The unwinding lever 17 is secured on a shaft 22 by means of a set screw 23 and a bifurcated lever 24 is secured on the shaft 22 so as to rotate together with the unwinding lever 17. A return spring 25 is attached to the outer peripheral surface of the shaft 22, while one end of the return spring 25 is hooked to the bifurcated lever 24 and the other end thereof is hooked to a member not shown, thereby loading the unwinding lever 17. A slide plate 31 is supported on the bifurcated lever 24 by means of a dowel 32, with an elongated hole 31a being bored in the slide plate 31. A guide pin 33 secured to a fixed member (not shown) is fitted in the elongated hole 31a, so that the slide plate 31 is moved in its longitudinal direction by the operation of the bifurcated lever 24. In addition, a dowel 35 secured to the unwinding plate 34 abuts a cam portion 31b provided on the slide plate 31, so that the unwinding plate 34 is moved up and down along a guide member 36 secured to a stationary member (not shown) in response to the movement of the slide plate, the aforenoted guide member 36 being fitted in an elongated hole 34a provided in the unwinding plate 34. The unwinding pin 18 is secured to the unwinding plate 34, and abuts the unwinding button 10 in a camera. When the dowel 35 rides over the cam portion 31b of the slide plate 31, then the unwinding plate 34 is moved upwards, thereby operating the unwinding button 10 in a camera. Furthermore, a switch actuating pin 37 made of an insulating material is secured to the slide plate 31, for changing over the switch 38. The switch 38 changes over the rotational direction of the electric motor 13. Thus, the electric motor 13 effects the rotation in the direction to take up a film when a contact 38a contacts a contact 38b, and rotates in the direction to unwind a film when the contact 38b contacts a contact 38c. Upon the unwinding operation, power is transmitted from the electric motor 13 via reduction gears 39, 40 to a worm 41 which is rotatably supported on a stationary member not shown, thereby rotating a worm wheel 42. Furthermore, the unwinding shaft 43 is fitted in a hole 42b provided in the worm wheel 42, and rotatably supported on a shaft. A concave portion 42a is provided in the worm wheel 42, while a convex portion 30b on the clutch 30 is fitted in the concave portion 42a, thereby establishing engagement therebetween. The clutch 30 is secured on the unwinding shaft 43, and an unwinding coupling member 19 in engagement with the film spool shaft 20 is also secured on the unwinding shaft 43. The aforenoted bifurcated lever 24 is locked against clockwise rotation by abutting a locking portion 44a provided at the tip of an upright portion of the locking lever 44. The locking lever 44 is rotatably supported on a stationary member (not shown) by means of a screw 45, and is so loaded as to rotate in an arrow direction under the action of a spring (not shown). In addition, the locking lever 44 may be disengaged from the bifurcated lever 24 by the operation of the locking button 21 which is slidably supported on a stationary member (not shown), and which abuts another upright portion 44c of the locking lever 44. When the locking button 21 is depressed, then the locking lever 44 is rotated counterclockwise, and the bifurcated lever 24 is set to a position to abut a cut away portion 44b in the locking lever 44, so that the unwinding lever 17 may be rotated, until the bifurcated lever 24 abuts the cut-away portion 44b provided in the locking lever. A multiple exposure operating member 46 is secured to the unwinding plate 34, and is so loaded as to be lowered under the action of a coil spring 47. In addition, one end of the coil spring 47 is hooked to a hook 34a of the unwinding plate 34, while the other end of the spring 47 is hooked to a dowel 48 secured to a stationary member not shown.

With the aforenoted arrangement, in the ordinary winding condition of FIG. 2, the contact 38a of the switch 38 is maintained in contact with the contact 38b by means of the switch-change-over pin 37 secured to the slide plate 31, so the electric motor 13 effects the rotation in the direction to take-up a film. In addition, since the convex portion 30a on the clutch 30 is disengaged from the concave portion 42a in the worm wheel 42, power from the electric motor 13 is transmitted only through the medium of reduction gears 39, 40 and worm 41 to the worm wheel 42 so as to rotate same without rotating the unwinding coupling member 19. In other words, the power is transmitted from the electric motor 13 only to the winding mechanism.

In FIG. 3, when the multiple-exposure operating member 46 is pushed, then the unwinding plate 34 is moved upwards, so as to operate the unwinding button by the unwinding pin 18, thereby disengaging the sprocket 5 from the winding mechanism and allowing the multiple exposure photography. In this case, the other mechanisms remain intact as shown in FIG. 2.

In FIG. 4, when the locking button 21 is depressed in the direction of the arrow until the button 21 abuts a stopper (not shown), then the unwinding lever 17 becomes rotatable. As a result, when the unwinding lever 17 is rotated clockwise the slide plate 31 is moved so as to lift the unwinding pin 18 for operating the unwinding button 10 in a camera, and then the convex portion 30b on the clutch is fitted in the concave portion 42a in the worm wheel, thereby bringing the worm wheel 42 into engagement with the clutch 30. As a result, the worm wheel 42 and clutch 30 may be rotated jointly, thereby transmitting a torque from the electric motor 13 to the unwinding coupling member 18, so that power may be transmitted to the film spool shaft 20 engaging the unwinding coupling member 19, thus providing an unwinding stand-by condition. Then, the switch-changeover pin 37 secured to the slide plate 31 is moved away from the contact 38b, while the contact 38b of the switch 38 contacts the contact 38c due to its resiliency, thereby causing the motor 13 to effect the rotation in the direction to unwind a film. Accordingly, a torque from the electric motor 13 is transmitted through the medium of reduction gears 39, 40 to the worm 41 to rotate same, and then to the worm wheel 42 so as to rotate the clutch 30 engaging the worm wheel 42, so the power is transmitted to the film spool shaft 20, thereby allowing the automatic unwinding operation. When the unwinding lever 17 is released, the unwinding lever 17 is returned to its normal position under the action of the return spring 25, while the portion 44a of the locking lever 44 engages the bifurcated locking lever 24 so as to lock same. This is referred to as a self-return system.

As is apparent from the foregoing description of the invention, positive multiple-exposure photography may be enabled in the condition where an automatic winding device is mounted on a camera, due to the independent provision of an operating member for use in multiple exposure. In addition, the positive automatic unwinding operation may be ensured by a series of operations, i.e., the operation of an unwinding button, the coupling of an unwinding shaft to a film spool shaft, and then the turning of an unwinding switch on in this order, thereby positively preventing an erroneous operation and malfunction with a simple mechanism which may reduce the number of parts to be used, with the many resulting advantages.

What is claimed is:

1. In a camera equipped with an automatic unwinding device and capable of multiple exposure operation, said camera having a film transport mechanism which is disabled by a means for disabling during both automatic unwinding and multiple exposure operations, the improvement characterized in that said disabling means comprises:

independently operable multiple exposure operating means for disengaging said film transport mechanism during multiple exposure photography; and automatic unwinding operating means for both engaging said automatic unwinding device and operating said multiple exposure operating means to implement automatic unwinding.

2. A camera according to claim 1, further comprising an electric motor operable in first and second rotational directions for performing both winding and unwinding operations, an unwinding drive member and a selectively engageable clutch coupling said electric motor and said unwinding drive member, said automatic unwinding operating means further comprising:

switch means for controlling the rotational direction of said electric motor;

means for selectively engaging said clutch for automatic unwinding.

3. A camera according to claim 1 or 2, wherein said automatic unwinding operating means comprises:

a first movable member movable between an operating position in which said multiple exposure member is operated and an inoperating position in which said multiple exposure member is not operated, said first movable member being biased to said inoperating position; and locking member having a locking position in which it locks said first movable member in said inoperating position and a release position in which said first movable member is permitted to move to said operating position, said locking member being normally biased to said locking position, whereby automatic unwinding is accomplished by first moving said locking member to said unlocking position and then moving said first movable member to said operating position.

* * * * *